Patented June 13, 1944

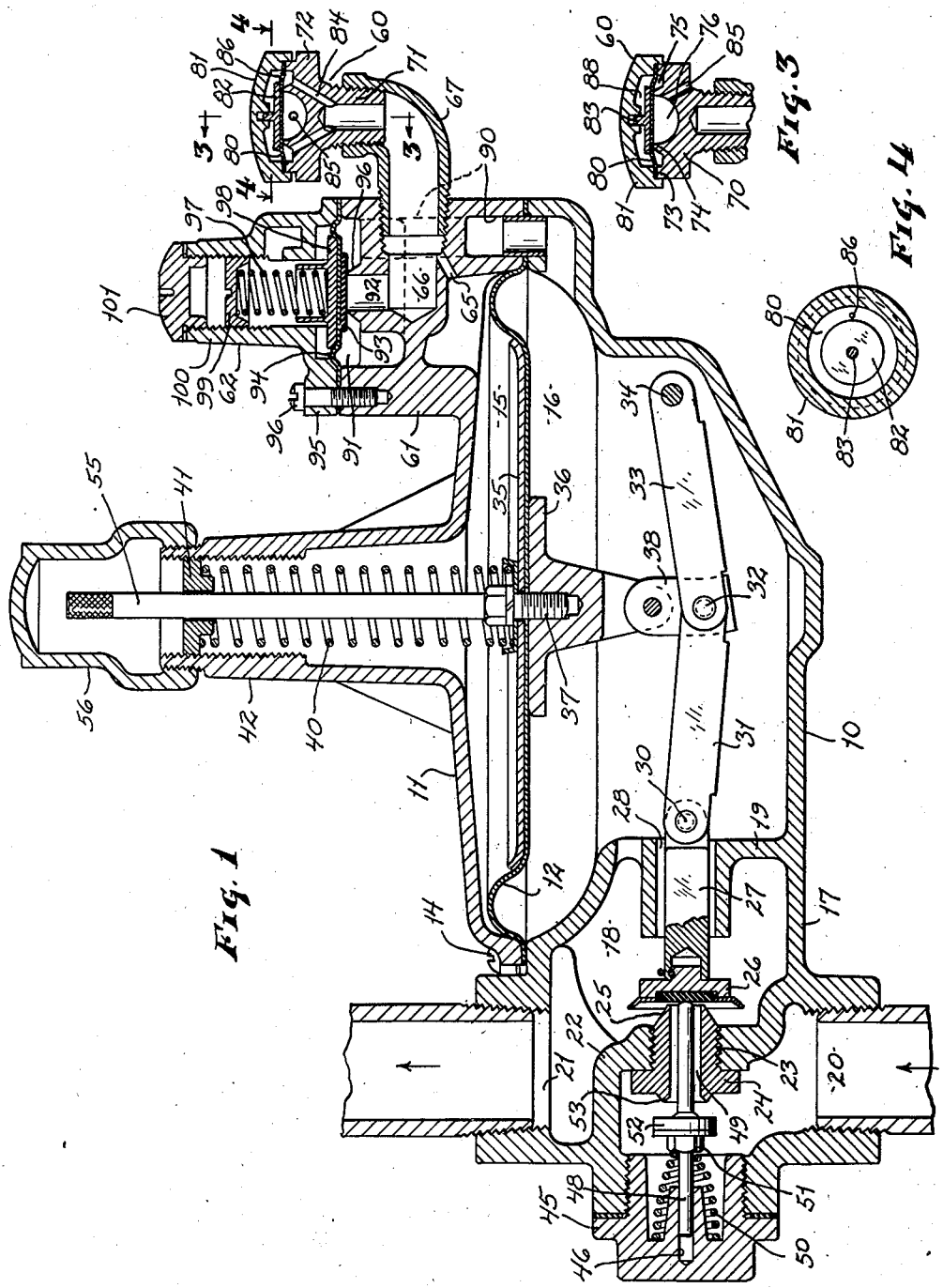

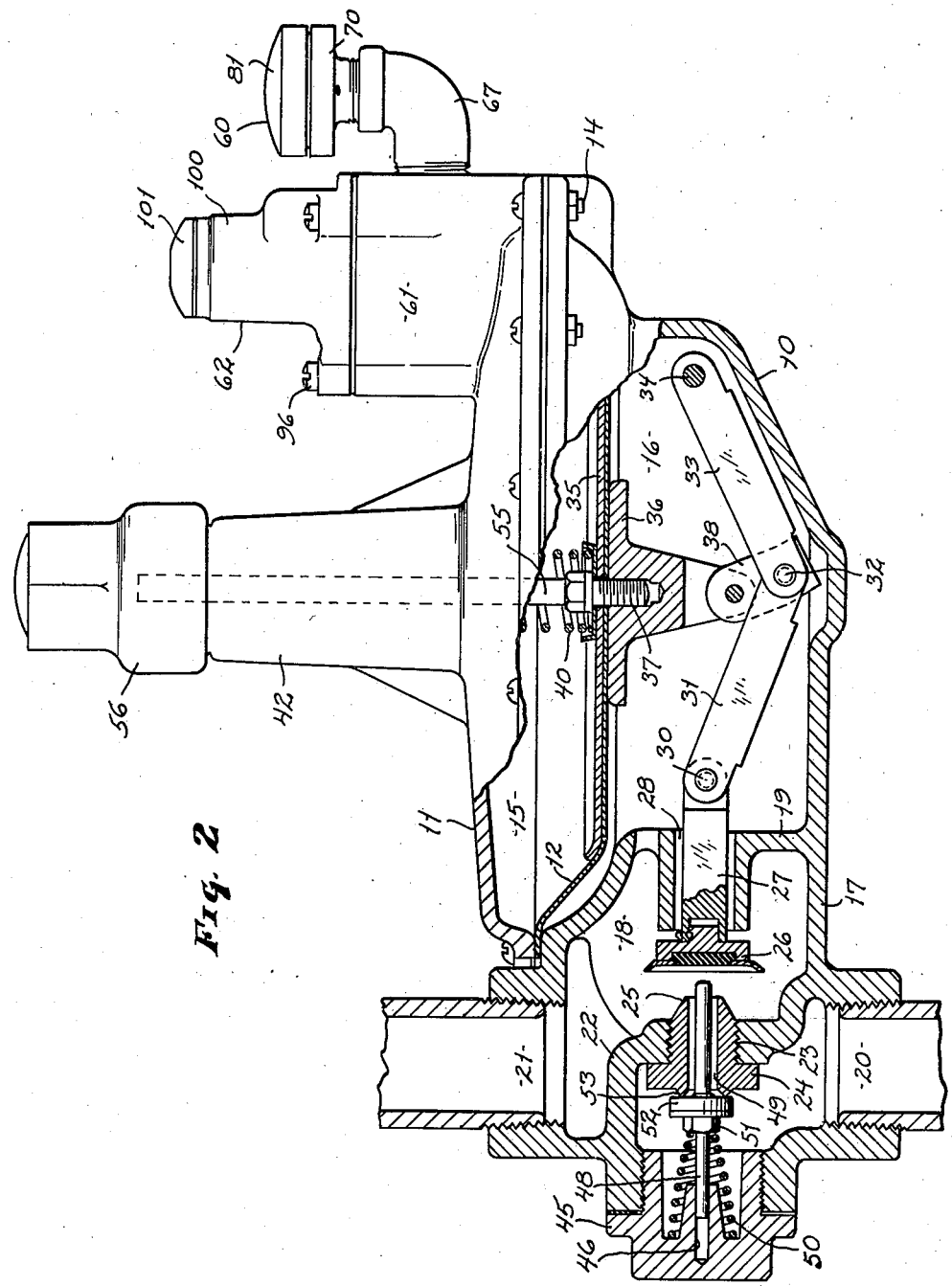

2,351,047

UNITED STATES PATENT OFFICE 2,351,047

FLUID PRESSURE REGULATOR

Ralph C. Hughes, Anderson, Ind., assignor to Reynolds Gas Regulator Company, Anderson, Ind., a corporation of Indiana Application September 8, 1941, Serial No. 409,962

9 Claims. (Cl. 50—4)

This invention relates to a fluid pressure regulator and more particularly to an improved fluid pressure regulator for controlling gas pressures for household and industrial gas appliances and general service lines. This, therefore, is the general object of the present invention.

Another object of the present invention is to provide an improved fluid pressure regulator which will automatically shut off the flow of fluid into the regulator consequent upon the failure of the inlet pressure or when the pressure in the outlet of the regulator rises above a predetermined maximum.

A further object of the invention is the provision of an improved gas pressure regulator with a mechanism so arranged as to relieve any excess pressure in the outlet side of the regulator, and which mechanism, consequent upon such relief, will shut off the flow of gas into the regulator and at the same time prevent the escape of any material amount of gas from the regulator.

A more specific object of this invention is to provide an improved gas pressure regulator which will automatically shut off the flow of gas into the regulator whenever the inlet pressure drops below a predetermined minimum or whenever the outlet pressure rises above a predetermined maximum and, at the same time, prevent the escape of any substantial amount of gas from the regulator or the regulator relief mechanism, which escape might be due to a failure of the regulator or the functioning of the relief mechanism.

A still further object of the invention is to provide an improved gas pressure regulator of the diaphragm operated type with a mechanism which will automatically shut off the flow of gas into the regulator whenever the outlet pressure of the regulator rises above a predetermined maximum or falls below a predetermined minimum, or whenever the diaphragm ruptures, and which flow will remain shut off indefinitely until the regulator is manually reset to place it in operation again.

Another object of this invention is to provide a pressure regulator with a pressure and relief mechanism with means to shut off the flow of gas to the regulator whenever the pressure responsive member thereof becomes ruptured, or whenever there is a failure in inlet pressure or whenever the outlet pressure exceeds a predetermined maximum and at the same time limits the volume of gas which may escape from the regulator under any of these conditions and regardless of the rate of flow of such escaping gas.

Other objects of the present invention will become more apparent from the following description, reference being had to a preferred embodiment illustrated in the accompanying drawings. The essential features of the invention will be summarized in the claims.

In the drawings, Fig. 1 is a vertical centrally located section through a regulator embodying my invention; Fig. 2 is a view similar to Fig. 1, but showing certain of the parts in a different position; Fig. 3 is a vertical fragmentary section as indicated by the lines 3—3 on Fig. 1, and Fig. 4 is a horizontal section as indicated by the correspondingly numbered lines on Fig. 1.

Referring now to the drawings in detail, and particularly to Fig. 1, it will be seen that the regulator comprises, as shown in Fig. 1, a hollow casing 10 surmounted by a hollow cap 11. A flexible gas impervious diaphragm 12 extends across the top of the casing and is held in place by the cap 11 which is secured to the casing by bolts 14. The diaphragm 12 thus divides the body of the regulator into an upper, or atmospheric chamber 15, and a lower, or pressure chamber 16. The casing 10 is provided with an extension 17 forming a valve chamber 18 which is separated from the pressure chamber 16 by a wall 19. The valve chamber is provided with an inlet opening 20 and an outlet opening 21. These openings are separated by a wall 22 provided with a valve port opening 23 through which gas may pass from the inlet to the outlet of the regulator.

The valve port opening 23 is preferably provided with a hollow valve seat member 24 having a valve seat 25 to coact with a valve 26 to control the flow of gas through the valve port opening. The valve 26 is secured to one end of a squared bar or valve stem 27 which is reciprocably mounted in a cylindrical guideway 28 formed in the wall 19 between the valve chamber 18 and the pressure chamber 16.

The valve member 26 is operated by the fluctuations of the diaphragm 12. As shown in the drawings, the valve stem 27 is pivotally connected as at 30 with one end of a link 31, the other end of which is pivotally connected, as at 32 with one end of a second link 33, which in turn is pivoted as at 34 to the casing 10. The diaphragm is gripped between upper and lower plates 35 and 36 respectively, which are secured together by stud 37. The lower plate 36 is pivotally connected by a link 38 with the pivotal connection 32 between the two links 31 and 33. Thus, as the diaphragm 12 rises due to an increase in pressure in the pressure chamber 16, the two links will be straightened and will force the valve member 26 toward or against the valve seat 25 and thus restrict or cut off the flow of gas into the regulator. However, when the pressure in the chamber 16 decreases, the diaphragm will lower, drawing the valve member 26 away from the valve seat to permit a greater volume of gas to flow from the inlet 20 to the outlet 21.

The diaphragm is normally pressed downward to cause the valve to open and admit fluid to the regulator until the pressure in the pressure chamber 16 reaches the desired outlet pressure. A compression spring 40 is interposed between the upper surface of the plate 35 and a nut 41 which is adjustably mounted in an upwardly extending tubular portion 42 of the cap 11. This adjustment facilitates the control of the tension on the diaphragm and accordingly regulates the outlet pressure.

In general the regulator just described and its operation is well known at the present time. Such regulators have several disadvantages. First, if the source of supply or inlet pressure fails completely, the tensioning spring acts to open the valve wide. Under such conditions, if the regulator is connected to a gas appliance using a pilot light, as is common practice today, the pilot will go out as the pressure fails. If thereafter the inlet pressure again becomes normal, gas will flow through the regulator to the appliance. Without a pilot to ignite this gas in the usual manner, the resumption of the flow of gas to the appliance presents a dangerous condition.

A second disadvantage of such regulators of the general type above described has been due to inadvertent rupture of, or seepage of gas through the flexible diaphragm 12. Either of these conditions permit gas to escape through the diaphragm into the atmospheric chamber 15 and thence through the usual vent, with which such chamber was provided, into the atmosphere. This has been a source of danger as it permitted gas to escape into the room in which the regulator was housed.

A third disadvantage in the regulators used in the past has been that after they had been in use for a considerable period of time, the valve member sometimes failed to make an efficient contact with the valve seat. Hence, the flow of gas from the inlet into the regulator was not stopped when there was no demand or flow through the service line. Even though the seat contact was good, foreign matter, such as dirt particles sometimes found their way between the seat and the valve member and prevented a complete closing of the valve. Under either of these conditions, the pressure in the pressure chamber and outlet of the regulator would rise until it equaled the inlet pressure. Thereafter, a demand for gas at the gas appliance would cause gas to be delivered at the inlet pressure rather than at the reduced pressure. Obviously, this was a source of danger.

The first disadvantage mentioned above is overcome in the present invention by a mechanism which, when the inlet pressure fails or even becomes less than a predetermined minimum, shuts off the flow of gas to the regulator and maintains this condition even though the inlet pressure again becomes normal and until the regulator has been manually reset. As shown in Fig. 1, the extension 17 of the regulator casing 10 is provided with a plug 45 carrying a guideway 46 which aligns with the valve stem 27 heretofore described. A plunger 48 is slidably mounted in this guideway and extends axially through the opening 49 in the valve seat 25. A spring 50 interposed between the plug 48 and an abutment 51 on the plunger normally acts to force the right hand end of the plunger (Fig. 1) into contact with the face of the valve 26. Intermediate its ends, the plunger 48 carries a valve member 52 arranged to coact with a seat 53 formed on the inlet side of the valve seat member 24.

When the pressure at the inlet opening 20 fails completely or becomes less than the pressure required to overcome the force of the diaphragm loading spring 40, a similar failure or decrease in pressure will exist in the regulator pressure chamber 16. This will permit the spring 40 to force the diaphragm to its lowermost position and move the valve member 26 to its extreme right hand (Fig. 2) or open position. While the valve member 26 moves to the open position, the spring 50 causes the valve 52 to move toward and contact the valve seat 53. The arrangement is such that this contact takes place before the valve member 26 reaches the limit of its movement. The contact of the valve member 52 with its seat 53 closes the passageway 49 through the valve seat member 24. Thereafter should the inlet pressure again become normal, such pressure acting on the rear or left hand surface of the valve member 52 will aid in maintaining such member closed, thereby preventing the flow of gas into the regulator as indicated in Fig. 2.

Once the valve member 52 has moved into contact with its seat 53, the flow of gas through the regulator is stopped until the regulator is manually reset. To enable the resetting of the regulator, the stud 37 is extended upwardly, as at 55, through an opening in the adjusting nut 41 into a cap 56 which is removably secured to the upper end of the tubular portion of the cover 11. The cap 56 and regulator casing 11 may be provided with the usual means to seal the cap in position in the usual manner, such as ears having openings through which a wire seal may be passed. Thus, it will be seen that when the flow of gas into the regulator has been shut off due to a failure of inlet pressure, there can be no flow of gas through the regulator until the stud or rod is manipulated to move the valve 52 to an open position, which operation may be made by a service man without removing the regulator from the gas lines and without altering the adjustments of the regulator.

The difficulties encountered consequent upon the rupture or leaking of the diaphragm 12 are avoided in the present invention by the use of a unit 60 which replaces the vent usually applied to the atmospheric chamber of the regulator. As shown in Fig. 1, the regulator cap is provided with an upwardly extending boss 61, which carries a pressure relief valve mechanism 62 hereinafter to be more fully described, and the automatic vent mechanism 60. The boss 61 is provided with a passageway 65 which leads from the atmospheric chamber 15 above the main regulator diaphragm 12 to a larger passageway 66 leading to the exterior of the boss 61. A conduit 67 is applied to the boss 61 and forms a continuation of the passageway 66. Mounted on the upper end of this conduit is the automatic vent 60.

The vent mechanism 60 comprises a body 70 having a reduced portion or shank 71 adapted to be threadingly secured to the outer end of the conduit 67 and an enlarged upper head portion 72. The upper surface of the head 72 of the vent is provided with a pair of upstanding annular ribs 73 and 74 forming therebetween an annular groove or channel 75 adjacent the periphery of the head, and a central cavity 76. A flexible gas impervious diaphragm 80 is positioned across the ribs 73 and 74 of the head 72 and held in contact with the rib 73 by a hollow cap 81 which may be secured to the head in any well known manner. The diaphragm 80 is normally held in position against the rib 74 by a weight 82 which is guided by the engagement of an attached stem 83 with a guideway formed in the cap 81. The head 70 of the vent is provided with passageways 84 which extend between the conduit 67 and the channel 75 in the vent, and a passageway 85 which extends between the central cavity 76 and the exterior of the vent and regulator. The vent diaphragm 80 is provided with a comparatively small orifice 86 which extends between the channel 75 and a chamber 88 above the vent diaphragm. When, in the normal operation of the regulator, the main regulator diaphragm 12 lowers, due to a demand on the regulator for gas which causes a decrease in pressure in the regulator chamber 16, a partial vacuum is simultaneously set up in the atmospheric chamber 15 of the regulator. By reasons of the passageways 65, 66 and 84, this partial vacuum or reduction of pressure is transmitted to the channel 75 in the vent head and through the orifice 86 in the vent diaphragm to the chamber 88 above the vent diaphragm. This causes the vent diaphragm to be forced upward by the atmospheric pressure acting on the vent diaphragm in the region of the central cavity 76. The moving of the vent diaphragm from its seat permits an influx of air through the passageway 85 to the channel 75, and thus to the atmospheric chamber 15 of the regulator, which is thus brought to a normal or atmospheric pressure condition.

Due to the comparatively small size of the orifice in the vent diaphragm there is a delay between the reduction of pressure in the chamber 15 of the regulator and the lifting of the vent diaphragm. This retards the opening of the regulator valve 26 upon sudden demands and prevents a sudden influx of gas under high pressure into the regulator, thus preventing pumping of the regulator diaphragm 12.

On the other hand, in the normal operation of the regulator, a decreased demand for gas is accompanied by an increase in pressure in the regulator pressure chamber 16 and the regulator diaphragm rises to reduce the flow of gas into the regulator. The rising movement of the diaphragm raises the pressure in the chamber 15. This rise in pressure is transmitted through the passageways 65 and 66 and 84, to the channel 75 beneath the vent diaphragm, and raises the vent diaphragm from its seat permitting an escape of air through the passageway 85 to bring the pressure in the regulator chamber 15 to atmospheric pressure. This action takes place immediately without retardation. When the pressure above the regulator diaphragm becomes equal to atmospheric pressure, the vent diaphragm closes.

Should the pressure in the pressure chamber 16 of the regulator increase due to the presence of foreign substances between the valve seat 25 and the valve 26, or to a leakage therebetween, or for any other reason which would cause an abnormally high pressure in the chamber 16, the regulator of the present invention will relieve such abnormal pressure so that it will not be transmitted to a gas appliance. Obviously, were the demand for gas on the regulator entirely shut off and a seepage existed between the seat 25 and the valve 26, the pressure in the regulator would be gradually built up until it equalled the inlet pressure. This would result in a dangerous condition were the gas to be turned on at an appliance.

The pressure relief 62 heretofore mentioned is arranged so as to prevent the pressure in the regulator chamber 16 rising above a predetermined maximum. This pressure relief mechanism is best shown in Fig. 1. The boss 61 of the regulator cap 11 is provided with a passageway 90 which communicates with the pressure chamber 16 and leads to an annular cavity 91 in the upper surface of the boss. This cavity is normally separated from a passageway 92 leading to the vent passageway 66 by a valve member 93 carried by a flexible gas impervious diaphragm 94, which extends across the upper surface of the boss 61 and is held in place thereon by a hollow cap 95. Any suitable means, such as bolts 96, may be used to secure the cap 95 to the boss 61. The valve member 93 is normally retained in contact with a seat 96 formed in the boss and extending around the passageway 92, by a spring 97. This spring is interposed between a weight 98 carried by the relief diaphragm 94 and an adjustable plug 99 which is threadingly secured in an upwardly extending portion 100 of the cap 95. A removable cap 101 is secured to the upper end of the portion 100 and serves to protect the plug 99 against inadvertent adjustment. The plug 101 may be sealed to the body of the regulator, or to the regulator sealing cap 55, by perforated lugs, not shown, but which may be attached to each cap and arranged to carry the usual lead and wire seal.

The operation of the relief mechanism is as follows. Consequent upon an abnormal increase in pressure in the regulator chamber 16, which is transmitted to the cavity 91 beneath the relief diaphragm 94, the resistance of the spring 97 is overcome and the diaphragm 94 moves upward, raising the valve 93 away from its seat 96. This permits the gas under pressure to pass through the passageways 92 and 66, into the automatic vent heretofore described. The gas under pressure thus enters the annular cavity 75 in the vent and causes the vent diaphragm to raise permitting gas to exhaust through the vent orifice 85. Only a small amount of gas will escape through the orifice, the arrangement being such that this amount is limited to less than one-half of a cubic foot. As the gas under pressure passes through the vent orifice 85, the orifice 86 in the vent diaphragm permits the pressure above and below such diaphragm to gradually equalize. Consequent upon such equalization the vent diaphragm 80 closes, whereupon no further gas may escape through the vent. The passageway 65 then permits the pressure to build up in the chamber 15 above the regulator diaphragm, until this pressure equals that in the chamber 16, whereupon the regulator spring 40 lowers the diaphragm 15 and, as heretofore described causes the valve member 25 to move to a fully opened position, whereupon the spring 50 closes valve member 52 against its seat 53, as heretofore described, thus positively shutting off the pressure at the inlet side of the regulator.

As already mentioned, the arrangement is such that the sealing of the vent takes place prior to the escape of more than one-half cubic foot of gas. This is made possible by the relative proportions of the areas of the vent diaphragm exposed to the chamber 88, the area exposed to the channel 75, and the area exposed to the central chamber 76 of the vent together with the relative cross sectional areas of the orifice 86 in the vent diaphragm and that of the vent passageway 85. I have found that, for practical purposes, it is desirable that the area of the vent diaphragm exposed to the chamber 88 be about three times the area of the diaphragm exposed to the central cavity 76 of the vent and that the area of the diaphragm 80 which is exposed to the channel 75 be about twice that of the area exposed to the cavity 76, and that the cross sectional area of the passageway 85 be from one and one-half to two times the area of the orifice 86 in the vent diaphragm 80.

I claim:

1. In a fluid pressure regulator having an inlet and an outlet, a valve member to control the flow of fluid between the inlet and outlet, a flexible diaphragm responsive to the pressure at the outlet side of the regulator to control the position of said valve, means whereby said diaphragm acts to move said valve to an extreme open position whenever the pressure at the outlet side of said regulator rises above a predetermined maximum or drops below a predetermined minimum, a second valve to control the flow of fluid between the inlet and outlet, and means to move said second valve into a closing position whenever the first valve moves to an extreme open position.

2. In a fluid pressure regulator having an inlet and an outlet, a valve member to control the flow of fluid between the inlet and outlet, a flexible diaphragm responsive to the outlet pressure in said regulator, a connection between the diaphragm and said valve member whereby the diaphragm fluctuations are transmitted to the valve, a second valve member, means normally acting on said second valve member and tending to move it into position to stop the flow of fluid into said regulator, the closing movement of said second valve member being opposed by the first named valve member during the normal operation of the regulator, means to relieve an excess pressure in the outlet side of the regulator and whereby consequent upon such relief the first named valve ceases to oppose the closing movement of the second named valve and means to prevent the fluid passing through the relief means from escaping from the regulator after a predetermined quantity of said fluid has escaped.

3. In a fluid pressure regulator having an inlet and an outlet, a valve member to control the flow of fluid between the inlet and outlet, a flexible diaphragm responsive to the outlet pressure of said regulator, a connection between the diaphragm and said valve member, a passageway between the outlet side of the regulator and the exterior thereof, means including a second pressure responsive diaphragm disposed across said passageway intermediate its ends to relieve an excess pressure in the outlet side of the regulator, a pressure responsive means normally closing said passageway to the exterior of the regulator, and whereby said last named means is adapted and arranged to limit the quantity of escaping fluid to a predetermined maximum regardless of the rate of flow of the escaping fluid.

4. A fluid pressure regulator comprising a body having an inlet and an outlet and a partition therebetween having a valve port extending therethrough, a valve to close said valve port, a flexible diaphragm having a chamber on one side thereof in communication with the outlet opening, and a second chamber on the other side thereof, a connection between said valve and diaphragm to convey the fluctuations thereof to said valve, means normally acting on said diaphragm with a predetermined force and tending to move it in a direction to cause said valve to open said valve port, a vent in said second chamber, means normally sealing said vent, a passageway between said vent and the first named chamber, means to close said passageway until the pressure in the first named chamber reaches a predetermined maximum, and means whereby said sealing means will first open automatically consequent upon the opening of the means closing said passageway and then return to a closed position regardless of whether or not the closing means remain open.

5. A fluid pressure regulator comprising a body having an inlet and an outlet and a partition therebetween having a valve port extending therethrough, a valve to close said valve port, a flexible gas impervious diaphragm having a chamber on one side thereof in communication with the outlet opening, and a second chamber on the other side thereof, a connection between said valve and diaphragm to convey the fluctuations thereof to said valve, means normally acting on said diaphragm with a predetermined force and tending to move it in a direction to cause said valve to open said valve port, a vent in said second chamber, means normally sealing said vent, a passageway between said vent and the first named chamber, means to close said passageway until the pressure in the first named chamber reaches a predetermined maximum, said sealing means being so arranged as to first open automatically consequent upon the opening of said passageway and then return to a closed position, a second passageway extending from a point in the vent between the closing means and the sealing means to the second named diaphragm chamber, and a second valve member movable into position to close the regulator inlet consequent upon the escape of fluid past said closing means through said second passageway into said second named diaphragm chamber.

6. A fluid pressure regulator comprising a body having an inlet and an outlet, a valve to control the passage of fluid therebetween, a flexible diaphragm responsive to pressure at said outlet to actuate said valve, a passageway comprising a vent between the outlet and the exterior of said regulator, means acting normally to seal said vent, closing means intermediate the ends of said passageway to close said passageway until pressure at the outlet exceeds a predetermined maximum, and means whereby said vent sealing means will first open automatically consequent upon the opening of said closing means and then return to a closed position even though the closing means is open and thereby re-seal the passageway.

7. In a fluid pressure regulator having an inlet and an outlet, a valve to control the flow of fluid between the inlet and outlet, a pressure responsive member to control the operation of said valve in accord with the pressure of the outlet side of the regulator, a pressure relief valve connected with the outlet side of the regulator to relieve excess pressure therein, an exhaust passageway leading from said relief valve to the exterior of the regulator, and means in said passageway to permit a sudden exhausting of pressure from the regulator consequent upon the operation of the relief valve, said last-named means being arranged and adapted to slowly retard the escape of fluid from the relief valve and ultimately stop said flow.

8. In a pressure regulator having an inlet and an outlet, a valve to control the flow of fluid between the inlet and outlet, a pressure responsive member connected to said valve to control the operation thereof in accord with the pressure at the outlet side of the regulator, a chamber at one side of said pressure responsive member in communication with the outlet side of the regulator, a chamber at the other side of said pressure responsive member, a pressure relief valve having its inlet side connected with the outlet side of the regulator to relieve excess pressure therein, and a connection between the outlet side of said relief valve and the second named diaphragm chamber, whereby consequent upon the operation of said relief valve the fluid pressure on both sides of said diaphragm may be equalized.

9. A fluid pressure regulator having an inlet and an outlet, a valve to control the flow of fluid between the inlet and outlet, a pressure responsive diaphragm to control the operation of said valve in accord with the pressure in the outlet side of the regulator, a chamber at one side of said diaphragm in communication with the outlet side of the regulator, a breathing chamber at the other side of said diaphragm, a pressure relief valve having an inlet and an outlet, the inlet of said relief valve being connected with the outlet side of the regulator, a passageway from the outlet side of said relief valve to the exterior of the regulator, a passageway from the outlet side of the relief valve to the breathing chamber of said regulator, and means connected with the first named passageway to gradually decrease the flow of fluid therethrough and ultimately stop the same, whereby fluid flowing through the pressure relief mechanism will be forced into the breathing chamber of the regulator, thereby balancing the pressure on both sides of the breathing chamber.

RALPH C. HUGHES.